Figure 1:
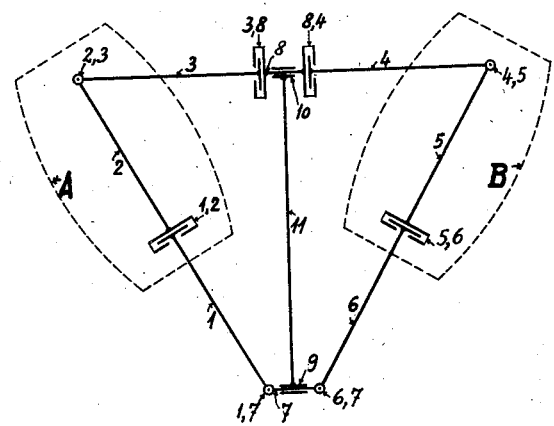

Nov. 24, 1942.   P. SCHATZ   2,302,804
MECHANISM PRODUCING WAVERING AND ROTATING MOVEMENTS OF RECEPTACLES
Filed Jan. 25, 1940   2 Sheets-Sheet 1

Inventor:
Paul Schatz

_Patented Nov. 24, 1942_

2,302,804

UNITED STATES PATENT OFFICE 2,302,804

MECHANISM PRODUCING WAVERING AND ROTATING MOVEMENTS OF RECEPTACLES

Paul Schatz, Dornach, Switzerland

Application January 25, 1940, Serial No. 315,629
In Switzerland February 5, 1939

9 Claims. (Cl. 259—72)

The present invention relates to a mechanism producing a wavering and rotating movement of a receptacle.

This mechanism utilizes a positively invertible kinematic chain. Such invertible kinematic chain systems are known to comprise rigid links connected by pivots, the axes of two successive links being askew to one another.

According to the present invention, a link of the chain is formed to a receptacle, and the movement of the chain, effected by driving means, is necessarily transmitted to the link of the receptacle. This link may also be formed to a frame for the reception of one or several interchangeable receptacles, and for this purpose a mounting device is provided. The frame, or the receptacle respectively is hinged together on both sides with connecting links which have been formed to prongs and overlap the receptacle. Due to the forked formation of the connecting links, the receptacle is in a position to considerably exceed the moving space of the kinematic identical link.

A mechanism of this description may be formed in such a manner that a diagonal connexion of a regular invertible chain composed of six links, and links displaced at 90° towards each other, is formed to a linkwork. This linkwork has two bearings which receive two parallel shafts rotating in a contrary sense. Both sides of the linkwork, which is also adapted to receive driving means, are provided with three links each of the chain.

The kinematic procedure of such a mechanism, i. e. the movement of an axially symmetric receptacle which is mounted on the middle link of half the invertible chain, for instance in such a manner that the symmetrical axis of the receptacle coincides with the connecting line of the central points of the adjacent link axes, is a periodic movement in four phases, its character being that of a harmonic vibrating movement, and such movement shows four components: (1) The receptacle rotates around its own axis, (2) The receptacle executes horizontal and vertical wavering movements which are connected with movements to and fro. The centre of gravity of the axial symmetric receptacle which, when mounted in the said manner, corresponds to the middle point of the middle link of half the invertible chain thereby describes an elongated loop in the form of an eight.

Receptacles which are to be subjected to the wavering and rotating movements described, may be in the nature of barrels, vessels, or bottles, and are brought to the cage or frame by means of adequate mounting devices. The mechanism may be used as a machine for cleaning the interior of vessels. The scrubbing-pressure which, when employing the usual machines adopted for this purpose, is solely provided by the weight of the cleansing means, for instance of a quartz-water-mixture, is in the present case directly dependent on the kinematic procedure described above. It is well known that the centrifugal force does not allow the utilization of greater speeds, as far as the usual rotating machines employed heretofore are concerned. As contrasted herewith, the mechanism of the present invention is of such nature that the contents of the receptacle as subjected to pulsating, and not to centrifugal effects. For this reason, uniform elastic force is to be noted on the inner walls of the receptacle. The mechanism may, therefore, also be favourably adopted for the purpose of impregnating the inner walls of a receptacle, as the kinematic procedure brings about a uniform and tight inner coating, after having previously introduced a liquid and stiffening filling to the receptacle.

If the frame is formed to receive a piece-form, a ceramic or similar form-moulding procedure may be effected, whereby extremely thin walls can be obtained. The mechanism may also be employed as a mixing-machine, ensuring quick and complete mixture of the elements. If the receptacle is formed to aspherical mill, the mechanism may be employed for the purpose of grinding the contents of the receptacle. It may also be used to accelerate the process of solution, for instance raw-rubber in benzine. If provisions are made to heat the entire exterior of the receptacle by means of a flame, for instance by the flame of a burner installed in the foundation, the mechanism is also particularly adapted to achieve chemical reactions requiring continuous shifting and mixing of the contents of the receptacle during the heating and roasting-process. In order to isolate higher temperatures or degrees of cold, the entire mechanism may be installed within a space resembling an oven. By means of this mechanism, articles of seamless hollow or bell-shaped metal forms with high fusing-point may be cast, without employing a core, whereby the mounted body would represent a smelting-furnace. This mechanism is also especially adapted to manufacture butter, inasmuch as it accelerates the churning-process, whereby the temperature is lower than when employing machines used up to the present, and therefore a greater output is obtained. It is also possible to mount the receptacles for maturing, which are half filled with cream, on to the frame-device which is so arranged that it receives the receptacles, without any necessity of pouring the contents of the receptacles into other vessels. The completing process of the manufacture of butter, i. e. washing and kneading the butter, can be carried out in the usual manner in the same receptacle.

In the drawings the invention is explained in several examples.

Fig. 1 schematically represents an invertible chain composed of six links, whereby the use of two links, positioned in a reflecting sense of the linkwork, as receptacle receiving elements is marked with the outlines of two barrels.

Figure 2:
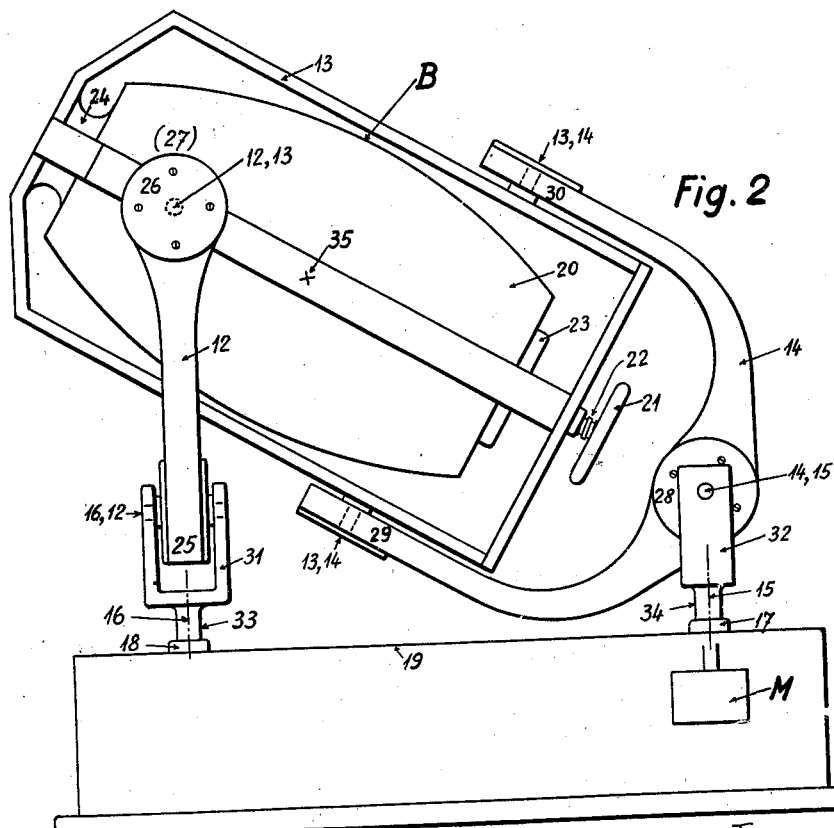

Fig. 2 represents a practical example of the object of invention, whereby only one-half of Fig. 1 has been employed for this construction.

In both cases the drawing plane has been considered as a vertical plane.

Figure 3:
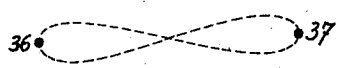

In Fig. 3 a loop in the form of an eight is shown, whereby the course of the centre of gravity of the symmetrically mounted receptacle is represented in horizontal plan.

Figure 4:
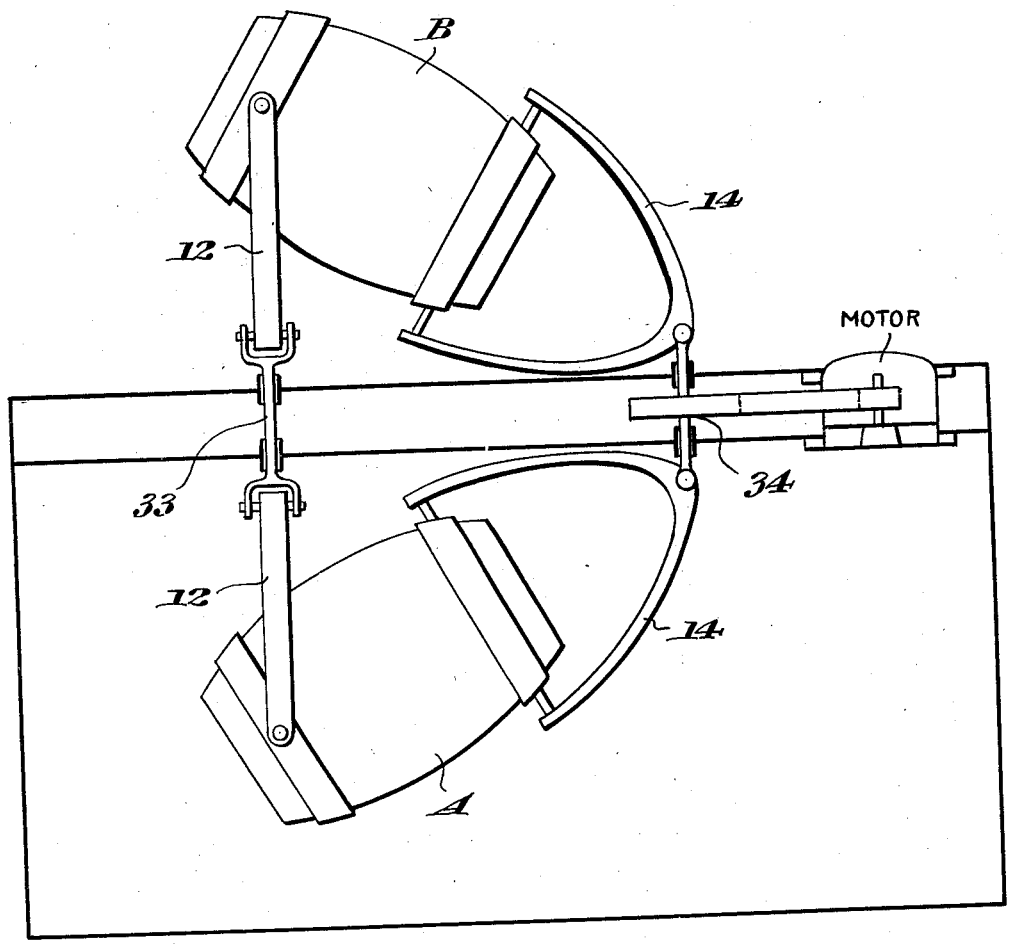

Fig. 4 is a side elevation partly in section of a modified structure.

The invertible chain shown in Fig. 1 is composed of six main links of equal length, 1, 2, 3, 4, 5, 6 and of two links formed as parallel running shafts 7 and 8. Corresponding to the markings of the links adjoining to one another, the axes of the links are marked 1, 2—2, 3—3, 8—8, 4—4, 5—5, 6—6, 7 and 7, 1. Axes 7, 1 and 1, 2—1, 2 and 2, 3—2, 3 and 3, 8—8, 4 and 4, 5—4, 5 and 5, 6—5, 6 and 6, 7 are askew to one another, however, axes 3, 8 and 8, 4 run parallel in respect to each other. Shafts 7 and 8 are held in cases 9 and 10, which are connected by means of the firm rod 11. This represents the linkwork of the chain. Certain links of the invertible chain—links 2 and 5 in the schematically shown example—are supporting devices, for instance frames for supporting purposes or for receiving receptacles, they could also be formed direct to receptacles. The dotted lines of A and B show two closed barrels with symmetrically arranged axes in relation to links 2 and 5, and thereby the central points of links 2 and 5 coincide with the centres of gravity of the receptacles. The further forming of the links of the chain involved thereby, is shown in a practical example in Fig. 2.

The kinematic connexion between the practical example shown in Fig. 2 and the right half of the schematic sketch as per Fig. 1 may distinctly be noted by picturing the latter to be turned around 90 degrees in the opposite sense of the hands of a clock. The parts of the machine in Fig. 2 referred to by numerals 12—19 correspond in kinematic respect to links 4—11 in Fig. 1. This conformity between Fig. 1 and Fig. 2 is reached by subtracting the number 8 from the reference numerals 12-19 in Fig. 2.

Links 12—14 are formed with prongs. Prong or fork member 12 in the sketch represents a side-view of prong or fork member 14 which is to be imagined as erected to 60 degrees. Link B is formed to a double-frame for the purpose of receiving barrel 20, which is fixed by means of an adequate mounting device, for instance, by means of a hand-wheel 21, spindle 22, pressing-plate 23 set up on its counterpart 24. Parts 25, 26, 27, 28, 29, 30 of the prongs are in ball-bearings which receive the shafts belonging to the link-axes 15, 12—12, 13—13, 14 and 14, 15. Again displaced by 90 degrees in respect to each other, the pivoting beds or forks 31 and 32 are shown on the drawings. Their continuation is represented by the driving-shafts 33 and 34 which run parallel at points 18 and 17 and are held in the foundation-box 19. Shafts 33 and 34 rotate in a contrary sense by adequate driving means, for instance by a motor M coupled direct with a shaft, or elastically, such motor being positioned in box 19. Whilst half a rotation of shaft 33 and of shaft 34 respectively takes place, the central point 35 of the system 13 and 20 describes a loop in form of an eight, shown in Fig. 3 (horizontal plan). Whilst a quarter of a rotation of shaft 33 and shaft 34 respectively takes place, point 35 (Fig. 2) moves from 36 to 37 (horizontal plan, Fig. 3).

By defining the linkwork as constrained, it is understood that this means a mechanism whose virtual displacements depend on one parameter only or a mechanism with one-coordinate of Lagrange.

What I claim is:

1. A mechanism for producing wavering and rotating movements, comprising a frame adapted to hold a receptacle, a fork member rotatably secured near one end of the frame, a second fork member rotatably secured near the other end of the frame, the axes of rotation of the fork ends on the frame being at right angles to each other, and a shaft for each fork member to rotate the fork members, said shafts being parallel to each other and at least one of them being a driving shaft for the mechanism.

2. A mechanism according to claim 1, in which each shaft is provided with a fork connection with its respective fork member.

3. A device for subjecting wavering and rotating movements to a receptacle, comprising a frame to removably receive the receptacle, a base member, a pair of shafts spaced to rotate vertically from the base member, a pair of bearings connecting the shafts from the frame, and means for rotating one of said shafts, each bearing including two forked members interconnected at right angles to each other of which one forked member is connected to the shaft and the other to the frame.

4. A mechanism for producing wavering and rotating movements, comprising a frame adapted to hold a receptacle, a pair of fork members one near each end of the frame, the axis of rotation of the fork members on the frame being at right angles to each other, and a second pair of forks each pivotally connected to the mid section of its respective first-mentioned fork member on an axis which is at right angles to said respective first-mentioned fork member, each second fork having an extension in the form of a shaft of which both shafts are parallel to each other.

5. A mechanism according to claim 4, in which at least one of the shafts is a driving shaft to rotate all the forks and the frame with a wavering motion added to the rotary motion for the frame.

6. Mechanism for producing a combination of rotating, tumbling and shaking movements of a receptacle, comprising a closed and constrained invertible kinematic linkwork, of which at least one link serves as a receptacle having a supporting device, driving means for the linkwork, the receptive link being hinged at both ends to two horse-shoe shaped links, which overlap the receptive link, the axes of the two hinges being at right angles to each other in different planes, 7. Mechanism for producing a combination of rotating, tumbling and shaking movements of a receptacle, comprising a closed and constrained invertible kinematic linkwork, of which at least one link serves as a receptacle having a supporting device, driving means for the linkwork, the receptive link being hinged at both ends to two horse-shoe shaped links, which overlap the receptive link, the axes of the two hinges being at right angles to each other in different planes, the two horse-shoe shaped links being hinged in the middle to two forked-shaped members, the axes of the fork-shaped members being at right angles to the axes of the adjoining horse-shoe shaped hinges in different planes.

8. Mechanism for producing a combination of rotating, tumbling and shaking movements of a receptacle, comprising a closed and constrained invertible kinematic linkwork, of which at least one link serves as a receptacle having a supporting device, driving means for the linkwork, the receptive link being hinged at both ends to two horse-shoe shaped links, which overlap the receptive link, the axes of the two hinges being at right angles to each other in different planes, the two horse-shoe shaped links being hinged in the middle to two forked-shaped members, the axes of the fork-shaped members being at right angles to the axes of the adjoining horse-shoe shaped hinges in different planes, the two fork-shaped members being inflexibly prolonged into two shafts, which are rotatably mounted in the supporting device so that they are parallel.

9. Mechanism for producing a combination of rotating, tumbling and shaking movements of a receptacle, comprising a closed and constrained invertible kinematic linkwork, of which at least one link serves as a receptacle having a supporting device, driving means for the linkwork, the receptive link being hinged at both ends to two horse-shoe shaped links, which overlap the receptive link, the axes of the two hinges being at right angles to each other in different planes, the two horse-shoe shaped links being hinged in the middle to two forked-shaped members, the axes of the fork-shaped members being at right angles to the axes of the adjoining horse-shoe shaped hinges in different planes, the two fork-shaped members being inflexibly prolonged into two shafts, which are rotatably mounted in the supporting device so that they are parallel, one of the two rotatably mounted shafts being coupled to a motor by a driving means.

PAUL SCHATZ.